(12) United States Patent
Piazza

(10) Patent No.: US 12,460,561 B2
(45) Date of Patent: Nov. 4, 2025

(54) LUBRICATION SYSTEM FOR A TURBINE ENGINE

(71) Applicant: GE Avio S.r.l., Rivalta di Torino (IT)

(72) Inventor: Andrea Piazza, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/751,990

(22) Filed: Jun. 24, 2024

(65) Prior Publication Data
US 2025/0116209 A1    Apr. 10, 2025

(30) Foreign Application Priority Data
Oct. 10, 2023 (IT) .......................... 102023000021051

(51) Int. Cl.
*F01D 25/20* (2006.01)
*F15B 1/04* (2006.01)

(52) U.S. Cl.
CPC ............... *F01D 25/20* (2013.01); *F15B 1/04* (2013.01)

(58) Field of Classification Search
CPC ..... F01D 25/18; F01D 25/20; F15B 1/04–265
See application file for complete search history.

(56) References Cited

U.S. PATENT DOCUMENTS

| | | | |
|---|---|---|---|
| 2,612,958 A | 10/1952 | Richardson | |
| 2,974,730 A | 3/1961 | Voisard | |
| 4,007,892 A | 2/1977 | Tabor | |
| 4,171,611 A | * | 10/1979 | Hueller .................... F01M 5/00 60/39.08 |

(Continued)

FOREIGN PATENT DOCUMENTS

| | | | |
|---|---|---|---|
| CN | 113202632 A | 8/2021 | |
| CN | 113898526 A | 1/2022 | |

(Continued)

OTHER PUBLICATIONS

Van De Ven, "Increasing Hydraulic Energy Storage Capacity: Flywheel-Accumulator," International Journal of Fluid Power 10, No. 3., pp. 41-50 (2009).

*Primary Examiner* — Minh Truong
(74) *Attorney, Agent, or Firm* — Venable LLP; Peter T. Hrubiec; Michele V. Frank

(57) ABSTRACT

A lubrication system for a turbine engine. The turbine engine includes a propulsor and rotating components. The lubrication system includes a sump, a primary lubrication system, an auxiliary lubrication system, and a kinetic energy storage system. The sump stores lubricant. The primary lubrication system supplies the lubricant from the sump to the rotating components during normal operation of the turbine engine. The auxiliary lubrication system includes an auxiliary pump. The kinetic energy storage system includes a rotating lubricant accumulator. The auxiliary pump pumps the lubricant from the sump to the rotating lubricant accumulator to at least partially fill the rotating lubricant accumulator with the lubricant during the normal operation of the turbine engine to store kinetic energy. The rotating lubricant accumulator releases the kinetic energy when the propulsor is windmilling to supply the lubricant from the rotating lubricant accumulator to the rotating components.

20 Claims, 2 Drawing Sheets

(56) References Cited

U.S. PATENT DOCUMENTS

| | | | |
|---|---|---|---|
| 5,836,421 A * | 11/1998 | Leicht | F01M 11/067 184/45.1 |
| 7,662,059 B2 | 2/2010 | McCune | |
| 7,834,471 B2 | 11/2010 | Cripps | |
| 7,849,668 B2 | 12/2010 | Sheridan | |
| 7,878,302 B2 | 2/2011 | Smith | |
| 7,883,438 B2 | 2/2011 | McCune | |
| 8,230,974 B2 | 7/2012 | Parnin | |
| 9,840,969 B2 | 12/2017 | Sheridan | |
| 9,903,227 B2 | 2/2018 | Cigal | |
| 10,107,135 B2 | 10/2018 | Schwarz et al. | |
| 10,145,276 B2 | 12/2018 | Parnin | |
| 10,208,624 B2 | 2/2019 | Duong | |
| 10,221,770 B2 | 3/2019 | Sheridan | |
| 10,267,233 B2 | 4/2019 | Mastro | |
| 10,513,949 B2 | 12/2019 | Parnin et al. | |
| 10,634,053 B2 | 4/2020 | Schwarz et al. | |
| 10,801,413 B2 | 10/2020 | Roberge | |
| 10,837,312 B2 | 11/2020 | Gates et al. | |
| 11,092,037 B2 | 8/2021 | Valva et al. | |
| 11,125,111 B2 | 9/2021 | Mason et al. | |
| 11,125,167 B2 | 9/2021 | Sheridan | |
| 11,174,797 B2 | 11/2021 | Gebhard | |
| 11,261,755 B2 | 3/2022 | Cornet et al. | |
| 11,428,163 B2 | 8/2022 | Parnin | |
| 11,511,872 B2 | 11/2022 | Staubach et al. | |
| 12,253,000 B2 * | 3/2025 | Williams | F02C 7/36 |
| 2012/0221157 A1 | 8/2012 | Finney et al. | |
| 2012/0222761 A1 * | 9/2012 | Poster | F16N 17/00 184/6 |
| 2013/0319006 A1 | 12/2013 | Parnin et al. | |
| 2014/0174855 A1 | 6/2014 | Motto | |
| 2017/0234158 A1 * | 8/2017 | Savela | F01D 25/164 416/1 |
| 2019/0323597 A1 | 10/2019 | Sheridan | |
| 2020/0284195 A1 * | 9/2020 | Gebhard | F02C 7/36 |
| 2022/0267021 A1 | 8/2022 | Zebian et al. | |

FOREIGN PATENT DOCUMENTS

| | | |
|---|---|---|
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| WO | 92/22747 A1 | 12/1992 |
| WO | 2023/052718 A1 | 4/2023 |

* cited by examiner

LUBRICATION SYSTEM FOR A TURBINE ENGINE

CROSS REFERENCE TO RELATED APPLICATIONS

The present application claims the benefit of Italian Patent Application No. 102023000021051, filed on Oct. 10, 2023, which is hereby incorporated by reference herein in its entirety.

TECHNICAL FIELD

The present disclosure relates generally to a lubrication system, for example, for a turbine engine.

BACKGROUND

Turbine engines generally include a propulsor (e.g., a propulsor) and a core section arranged in flow communication with one another. Some turbine engines include one or more rotating components that rotate. A lubrication system provides a lubricant to the one or more rotating components of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
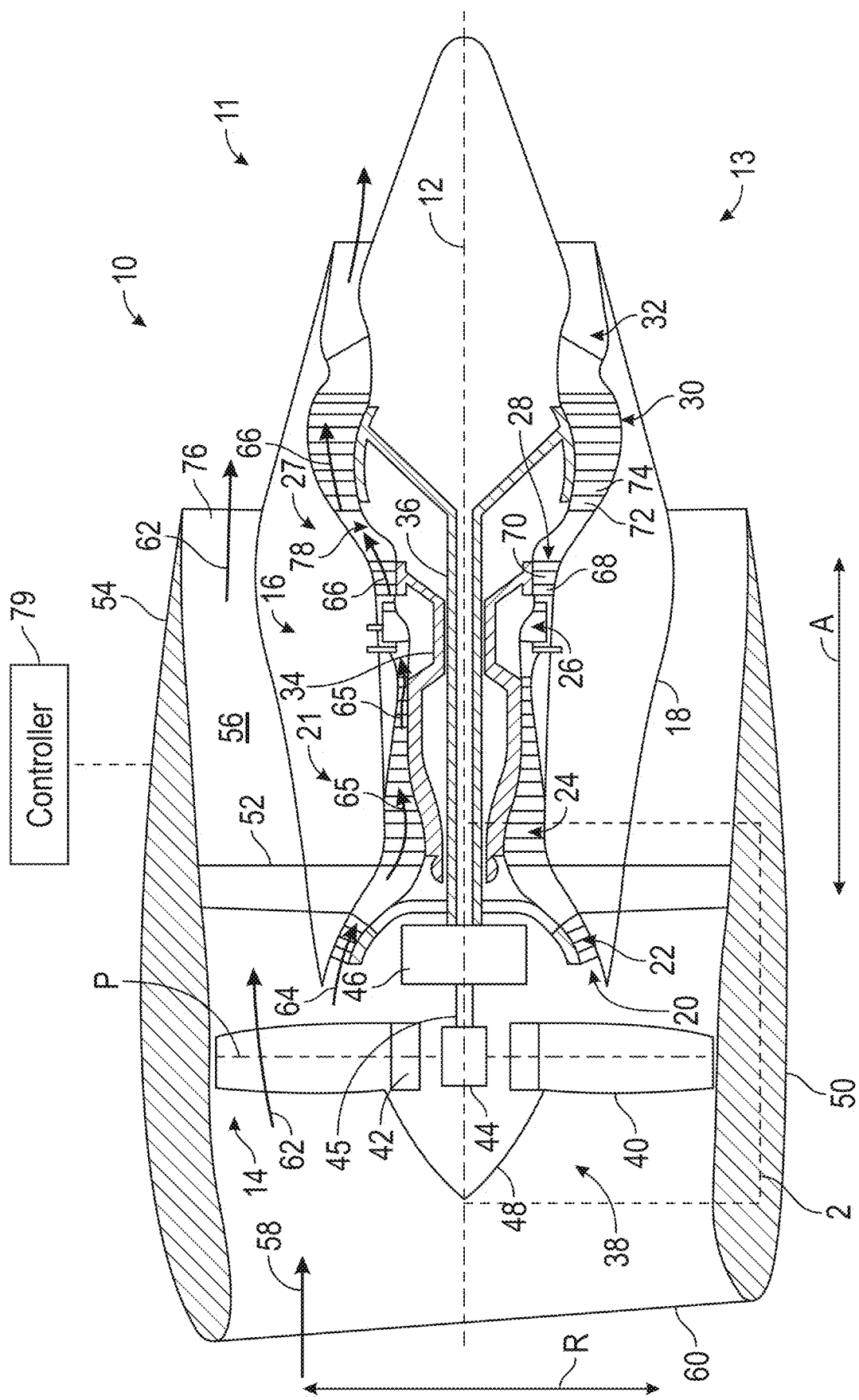
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "propulsor" is a component of the turbine engine that is drivingly coupled to the turbo-engine such that rotation of the components of the turbo-engine causes the propulsor to rotate and to generate thrust. A propulsor can include a fan or a propeller. In turbofan engines or open fan engines, the propulsor is a fan. In turboprop engines, the propulsor is a propeller.

As used herein, "normal operation" of a turbine engine is intended to mean when the turbine engine is operating, and a primary lubrication system of the turbine engine is supplying lubricant to one or more rotating components of the turbine engine. Normal operation can include a mission cycle of the turbine engine after the turbine engine is powered on, including, for example, idle conditions, taxiing conditions, takeoff conditions, cruise conditions, descent conditions, or landing conditions.

As used herein, "windmill" or "windmilling" is a condition when the propulsor and the low-pressure shaft of the turbine engine continue to rotate at low speeds, while the high-pressure shaft rotates slowly or even stops. Windmilling can occur when the turbine engine is shut down, but air still flows across the propulsor, such as during an in-flight engine shutdown or when the turbine engine is on the ground and the propulsor is rotating in the presence of wind when the turbine engine is shutdown. During a shutdown, e.g., while the aircraft is on the ground, the propulsor may also rotate in either direction depending upon the stationary position of the turbine engine relative to the ambient wind. Airflow entering the propulsor exhaust may exit the propulsor inlet in an opposite direction as a direction of operation and cause the propulsor to rotate in an opposite rotational direction compared to the intended operational rotational direction.

As used herein, "active," "activate" or "activating" an auxiliary lubrication system includes causing lubricant to flow within the auxiliary lubrication system. For example, activating the auxiliary lubrication system includes opening a valve such that the lubricant flows through the auxiliary lubrication system to one or more rotating components of the turbine engine.

As used herein, to "inactivate" an auxiliary lubrication system or an "inactive" auxiliary lubrication system includes preventing the lubricant from flowing within the auxiliary lubrication system. For example, when the auxiliary lubrication system is inactive, the valve is closed to prevent the lubricant from flowing through auxiliary lubrication system to the one or more rotating components of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

The present disclosure provides for a turbine engine having a lubrication system. The turbine engine includes a propulsor having a propulsor shaft. The turbine engine includes a one or more rotating components that rotate within the turbine engine. The one or more rotating components can include, for example, one or more shafts, one or more gears, or one or more bearings including one or more engine bearings for the one or more shafts of the turbine engine (e.g., a low-pressure shaft or a high-pressure shaft) or one or more power gearbox bearings for a power gearbox assembly of the turbine engine. The one or more power gearbox bearings allow rotation of one or more power gearbox gears of the power gear assembly about the one or more power gearbox bearings. In one embodiment, one or more of the bearings are journal bearings. The one or more bearings can include any type of bearings, such as, for example, roller bearings, or the like. The lubrication system supplies a lubricant (e.g., oil) to the one or more rotating components. The lubrication system includes a sump that stores lubricant therein, and a primary lubrication system having a primary pump and a primary lubricant supply line. During normal operation of the turbine engine, the primary pump pumps the lubricant from the sump to the one or more rotating components through the primary lubricant supply line.

The bearings, especially, journal bearings, are hydrodynamic bearings that typically require a steady supply of lubricant during all operational phases of the turbine engine to properly lubricate the bearings to prevent damage due to sliding contact for hydrodynamic journal bearings or even for the generic gear mesh interface. The shafts of the turbine engine may experience long duration, continued rotation following a shutdown of the turbine engine, such as that occurring during windmilling. In such instances, the one or more rotating components, and, in particular, the one or more bearings, can be affected by not receiving enough lubricant for lubricating the one or more rotating components. For example, during windmilling, the rotational speed of the shafts may be too low to power the primary pump to pump the lubricant to the one or more rotating components. In some instances, e.g., during operation of the turbine engine (e.g., in-flight), the lubrication system may lose pressure (e.g., due to a failure of the primary pump or other components of the primary lubrication system), such that the primary lubrication system is unable to provide the lubricant to the one or more rotating components via the primary pump and the primary lubricant supply line.

The criticality of the lubricant interruptions increases when the bearings are journal bearings, since the absence of lubricant at the journal bearings can lead to a journal bearing failure and subsequent gearbox failure, which may cause the low-speed shaft to lock up permanently. Such a failure of the journal bearings is referred to as a journal bearing seizure and occurs when there is contact between the planet pin and the bore of the gear, thereby causing a significant increase of wear and friction that leads to bearing failure. If contact occurs between the journal bearing and the pin during high-power operation, the two components can become welded together due to the high temperature from the friction.

Some turbine engines include an auxiliary lubrication system that includes an auxiliary pump to supply lubricant to the one or more rotating components to prevent damage to the rotating components due to inadequate lubricant supply during windmilling. Such auxiliary pumps may be drivingly coupled to the propulsor shaft and requires added complexity for driving the auxiliary pump by the propulsor shaft. Further, the auxiliary pump requires added complexity to provide the lubricant during high speeds, such as during operation of the turbine engine, and during low speeds, such as during windmilling (e.g., in-flight or on the ground). Further, the auxiliary pump requires added complexity to provide the lubricant while the propulsor windmills in either direction (e.g., the propulsor rotates clockwise or counter-clockwise).

Accordingly, the present disclosure provides an auxiliary lubrication system that supplies the lubricant to the one or more rotating components during any time that the primary lubrication system is unable to supply the lubricant. In particular, the present disclosure provides for supplying lubricant to the one or more rotating components (e.g., journal bearings) when the turbine engine is shut down or whenever the turbine engine is windmilling, to avoid journal bearing seizure. The present disclosure provides a kinetic energy storage system that stores kinetic energy during normal operation of the turbine engine. In particular, the kinetic energy storage system is drivingly coupled to an accessory gearbox of the turbine engine and activates when the turbine engine is shut down or is otherwise windmilling. The kinetic energy storage system releases the stored kinetic energy to supply the lubricant to the one or more rotating components when the turbine engine is shut down or the propulsor is otherwise windmilling.

The kinetic energy storage system includes a rotating lubricant accumulator that is filled with an inert gas (e.g., nitrogen) and a membrane that separates the inert gas from lubricant in the rotating lubricant accumulator. In this way, the rotating lubricant accumulator stores kinetic energy in the form of an increased gas pressure of the inert gas as the lubricant fills the rotating lubricant accumulator. At the same, the rotating lubricant accumulator rotates to store additional kinetic energy in the form of angular momentum (e.g., moment of inertia). During the normal operation of the turbine engine, an auxiliary pump fills the rotating lubricant accumulator with the lubricant and a hydraulic motor rotates the rotating lubricant accumulator, allowing the rotating lubricant accumulator to rotate to store kinetic energy. When the turbine engine is shut down and the propulsor is windmilling, a first valve switches to close to keep the lubricant in the circuit and a second valves switches to open to allow the lubricant to flow from the rotating lubricant accumulator to the one or more rotating components to lubricate the one or more rotating components.

Accordingly, the auxiliary lubrication system supplies lubricant to the one or more rotating components while the turbine engine is shut down or is otherwise windmilling. The kinetic energy storage system ensures that the auxiliary pump operates to pump the lubricant to the one or more rotating components independently of the rotational direction of the propulsor during windmilling (e.g., whether the propulsor is rotating clockwise or counterclockwise). The kinetic energy storage system provides significant energy storage density due to both the pressurized gas and the rotational energy provided by the system.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In the orientation of FIG. 1, portions of the turbine engine 10 above the longitudinal centerline axis 12 are referred to as a top portion 11 and portions of the turbine engine 10 below the longitudinal centerline axis 12 are referred to as a bottom portion 13. In general, the turbine engine 10 includes a propulsor section 14 and a turbo-engine 16 disposed downstream from the propulsor section 14.

The turbo-engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or a spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The HP shaft 34, the LP shaft 36, or both the HP shaft 34 and the LP shaft 36 are supported by one or more engine bearings that allow the HP shaft 34 or the LP shaft 36 to rotate, as detailed further below. The compressor section 21, the combustion section 26, the turbine section 27, and the jet exhaust nozzle section 32 together define a core air flow path.

For the embodiment depicted in FIG. 1, the propulsor section 14 includes a propulsor 38 (e.g., a variable pitch propulsor) having a plurality of propulsor blades 40 coupled to a disk 42 in a spaced apart manner. In the embodiment of FIG. 1, the propulsor 38 is a fan that is driven by the turbo-engine 16. In some embodiments, the propeller 38 is a propeller that is driven by the turbo-engine 16. The propulsor blades 40 extend outwardly from the disk 42 generally along the radial direction R. Each propulsor blade 40 is rotatable relative to the disk 42 about a pitch axis P by virtue of the propulsor blades 40 being operatively coupled to an actuation member 44 configured to collectively vary the pitch of the propulsor blades 40 in unison, as detailed further below. The propulsor blades 40, the disk 42, and the actuation member 44 are together rotatable about the longitudinal centerline axis 12 via a propulsor shaft 45 that is powered by the LP shaft 36 across a power gearbox, also referred to as a power gearbox assembly 46. The power gearbox assembly 46 is shown schematically in FIG. 1. The power gearbox assembly 46 includes a plurality of power gearbox gears for adjusting the rotational speed of the propulsor shaft 45 and, thus, the propulsor 38 relative to the LP shaft 36. The power gearbox assembly 46 also includes one or more power gearbox bearings for supporting rotation of one or more of the plurality of power gearbox gears, as detailed further below.

Referring still to the exemplary embodiment of FIG. 1, the disk 42 is covered by a propulsor hub 48 that is aerodynamically contoured to promote an airflow through the plurality of propulsor blades 40. In addition, the propulsor section 14 includes an annular propulsor casing or a nacelle 50 that circumferentially surrounds the propulsor 38 and at least a portion of the turbo-engine 16. The nacelle 50 is supported relative to the turbo-engine 16 by a plurality of outlet guide vanes 52 that is circumferentially spaced about the nacelle 50 and the turbo-engine 16. Moreover, a downstream section 54 of the nacelle 50 extends over an outer portion of the turbo-engine 16 to define a bypass airflow passage 56 therebetween.

During operation of the turbine engine 10, a volume of air 58 enters the turbine engine 10 through an inlet 60 of the nacelle 50 or the propulsor section 14. As the volume of the air 58 passes across the propulsor blades 40, a first portion of air, referred to as bypass air 62, is directed or is routed into the bypass airflow passage 56, and a second portion of air, referred to as core air 64, is directed or is routed into the upstream section of the core air flow path, or, more specifically, into the annular inlet 20 of the LP compressor 22. The ratio between the bypass air 62 and the core air 64 is commonly known as a bypass ratio. The pressure of the core air 64 is then increased, generating compressed air 65, and the compressed air 65 is routed through the HP compressor 24 and into the combustion section 26, where the compressed air 65 is mixed with fuel and burned to generate combustion gases 66.

The combustion gases 66 are routed into the HP turbine 28 and expanded through the HP turbine 28 where a portion of thermal energy or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of the thermal energy or kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the propulsor 38 via the power gearbox assembly 46.

The combustion gases 66 are subsequently routed through the jet exhaust nozzle section 32 of the turbo-engine 16 to provide propulsive thrust. Simultaneously, the pressure of the first portion of air 62 is substantially increased as the first portion of air 62 is routed through the bypass airflow passage 56 before being exhausted from a propulsor nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

A controller 79 is in communication with the turbine engine 10 for controlling aspects of the turbine engine 10. For example, the controller 79 is in two-way communication with the turbine engine 10 for receiving signals from various sensors and control systems of the turbine engine 10, and for controlling components of the turbine engine 10, as detailed further below. The controller 79, or components thereof, may be located onboard the turbine engine 10, onboard the aircraft (not shown), or can be located remote from each of the turbine engine 10 and the aircraft. The controller 79 can be a Full Authority Digital Engine Control (FADEC) that controls aspects of the turbine engine 10.

The controller 79 may be a standalone controller or may be part of an engine controller to operate various systems of the turbine engine 10. In this embodiment, the controller 79 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 79 to perform operations. The controller 79 and, more specifically, the one or more processors are programmed or configured to perform these operations, such as the operations discussed further below. In some embodiments, the instructions can be executed by the one or more processors to cause the one or more processors to complete any of the operations and functions for which the controller 79 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a wide variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the propulsor 38 may be configured in any other suitable manner (e.g., as a fixed pitch propulsor) and further may be supported using any other suitable propulsor frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
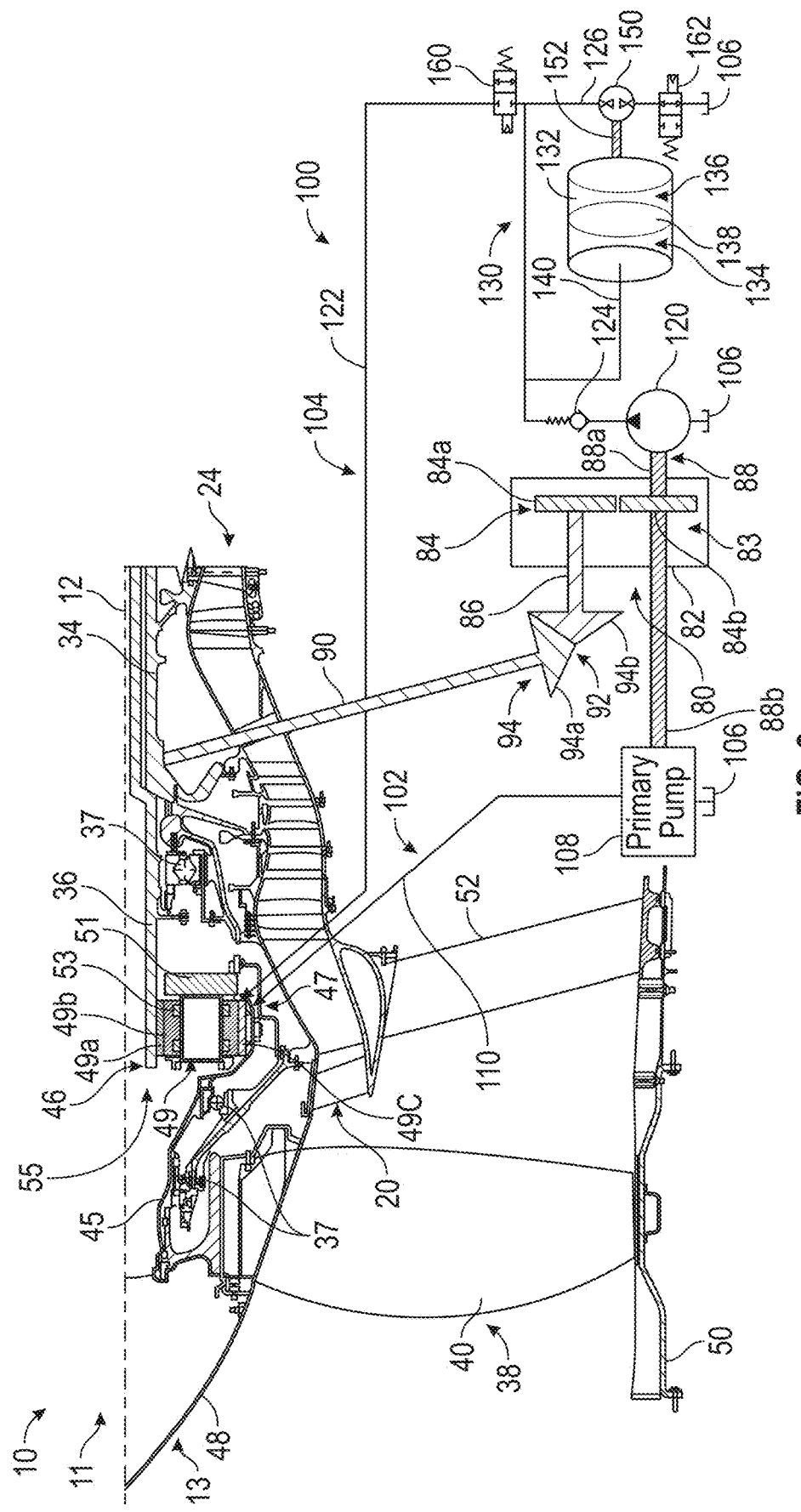
FIG. 2 is a detailed schematic cross-sectional view of a portion of the turbine engine of FIG. 1, taken at detail 2 in FIG. 1, according to the present disclosure.

FIG. 2 is a detailed schematic cross-sectional view of a portion of the turbine engine 10, taken at detail 2 in FIG. 1, according to the present disclosure. As shown in FIG. 2, the turbine engine 10 includes one or more engine bearings 37 that support rotation of the LP shaft 36 and the propulsor shaft 45. The one or more engine bearings 37 can also support rotation of the HP shaft 34. The one or more engine bearings 37 can include any number of engine bearings 37 for supporting rotation of the shafts of the turbine engine 10. The one or more engine bearings 37 are referred to as rotating components of the turbine engine 10, and can include any type of bearing, such as, for example, journal bearings, roller bearings, or the like.

The power gearbox assembly 46 includes a power gearbox gear assembly 47 having a plurality of power gearbox gears 49. The plurality of power gearbox gears 49 includes a first power gearbox gear 49a, one or more second power gearbox gears 49b secured by a planet carrier 51, and a third power gearbox gear 49c. In FIG. 2, the first power gearbox gear 49a is a sun gear, the one or more second power gearbox gears 49b are planet gears, and the third power gearbox gear 49c is a ring gear. The power gearbox gear assembly 47 can be an epicyclic gear assembly. When the power gearbox gear assembly 47 is an epicyclic gear assembly, the one or more second power gearbox gears 49b include a plurality of second power gearbox gears 49b (e.g., two or more second power gearbox gears 49b).

In the epicyclic gear assembly, the power gearbox gear assembly 47 can be in a star arrangement or a rotating ring gear type gear assembly (e.g., the third power gearbox gear 49c is rotating and the planet carrier 51 is fixed and stationary). In such an arrangement, the propulsor 38 is driven by the third power gearbox gear 49c. For example, the third power gearbox gear 49c is coupled to the propulsor shaft 45 such that rotation of the third power gearbox gear 49c causes the propulsor shaft 45, and, thus, the propulsor 38, to rotate. In this way, the third power gearbox gear 49c is an output of the power gearbox gear assembly 47. However, other suitable types of gear assemblies may be employed. In one non-limiting embodiment, the power gearbox gear assembly 47 is a planetary arrangement, in which the third power gearbox gear 49c is held fixed, with the planet carrier 51 allowed to rotate. In such an arrangement, the propulsor 38 is driven by the planet carrier 51. For example, the planet carrier 51 is coupled to the propulsor shaft 45 such that rotation of the planet carrier 51 causes the propulsor shaft 45, and, thus, the propulsor 38, to rotate. In this way, the one or more second power gearbox gears 49b (e.g., via the planet carrier 51) are the output of the power gearbox gear assembly 47. In another non-limiting embodiment, the power gearbox gear assembly 47 may be a differential gear assembly in which the third power gearbox gear 49c and the planet carrier 51 are both allowed to rotate. While an epicyclic gear assembly is detailed herein, the power gearbox gear assembly can include any type of gear assembly including, for example, a compound gear assembly, a multiple stage gear assembly, or the like.

The plurality of power gearbox gears 49 includes one or more power gearbox bearings 53 disposed therein. For example, the one or more second power gearbox gears 49b each includes one or more power gearbox bearings 53 disposed therein. The one or more power gearbox bearings 53 enable the plurality of power gearbox gears 49 to rotate about the one or more power gearbox bearings 53 such that the plurality of power gearbox gears 49 rotates. The one or more power gearbox bearings 53 can include any type of bearing for a gear, such as, for example, journal bearings, roller bearings, or the like. The plurality of power gearbox gears 49 and the one or more power gearbox bearings 53 are rotating components of the turbine engine 10. Accordingly, the turbine engine 10 includes one or more rotating components 55 that includes at least one of the one or more engine bearings 37, the plurality of power gearbox gears 49, or the one or more power gearbox bearings 53. The one or more rotating components 55 can also include the HP shaft 34 or the LP shaft 36.

The first power gearbox gear 49a is coupled to an input shaft of the turbine engine 10. For example, the first power gearbox gear 49a is coupled to the LP shaft 36 such that rotation of the LP shaft 36 causes the first power gearbox gear 49a to rotate. Radially outward of the first power gearbox gear 49a, and intermeshing therewith, is the one or more second power gearbox gears 49b that are coupled together and supported by the planet carrier 51. The planet carrier 51 supports and constrains the one or more second power gearbox gears 49b such that each of the one or more second power gearbox gears 49b is enabled to rotate about a corresponding axis of each second power gearbox gear 49b without rotating about the periphery of the first power gearbox gear 49a. Radially outwardly of the one or more second power gearbox gears 49b, and intermeshing therewith, is the third power gearbox gear 49c, which is an annular ring gear. The third power gearbox gear 49c is coupled via an accessory gearbox output shaft to the propulsor 38 and rotates to drive rotation of the propulsor 38 about the longitudinal centerline axis 12. For example, the propulsor shaft 45 is coupled to the third power gearbox gear 49c.

The turbine engine 10 includes an accessory gearbox assembly 80. One or more accessories for the turbine engine 10 or the aircraft can be coupled to the accessory gearbox assembly 80 for powering the one or more accessories. As shown in FIG. 2, the accessory gearbox assembly 80 includes an accessory gearbox housing 82 and an accessory gearbox gear assembly 83 including a plurality of accessory gearbox gears 84. The accessory gearbox gear assembly 83 is disposed within the accessory gearbox housing 82. The plurality of accessory gearbox gears 84 includes a first accessory gearbox gear 84a and a second accessory gearbox gear 84b that is intermeshed with the first accessory gearbox gear 84a. The plurality of accessory gearbox gears 84 can include any number of gears, as desired, and can include any type of gear, such as, for example, spur gears, bevel gears, compound gears, or the like.

The accessory gearbox assembly 80 includes an accessory gearbox input shaft 86 and an accessory gearbox output shaft 88. In examples where the accessory gearbox assembly 80 drives the primary pump 108, the accessory gearbox output shaft 88 may include a first output shaft 88a and a second output shaft 88b. The accessory gearbox input shaft 86 is coupled to one of the plurality of accessory gearbox gears 84 to cause the plurality of accessory gearbox gears 84 to rotate, as detailed further below. In FIG. 2, the accessory gearbox input shaft 86 is coupled to the first accessory gearbox gear 84a. In this way, rotation of the accessory gearbox input shaft 86 causes the first accessory gearbox gear 84a to rotate. The accessory gearbox output shaft 88 is coupled to at least one of the plurality of accessory gearbox gears 84 such that rotation of the plurality of accessory gearbox gears 84 causes the accessory gearbox output shaft 88 to rotate. In FIG. 2, the accessory gearbox output shaft 88 is coupled to the second accessory gearbox gear 84b such that rotation of the second accessory gearbox gear 84b causes the accessory gearbox output shaft 88 to rotate.

The accessory gearbox assembly 80 is coupled to the HP shaft 34 via a towershaft 90 that is extended from, and is rotatable with, the HP shaft 34. In some embodiments, the accessory gearbox assembly 80 is coupled to the LP shaft 36. In FIG. 2, the towershaft 90 is generally extended at least partially along the radial direction R from the HP shaft 34. The towershaft 90 may extend at an acute angle relative to the longitudinal centerline axis 12, such as shown in FIG. 2. In some embodiments, the towershaft 90 can extend generally perpendicular to the HP shaft 34. The towershaft 90 can be coupled to the HP shaft 34 by a plurality of gears. The towershaft 90 is coupled to the accessory gearbox input shaft 86 by a towershaft gear assembly 92 having a plurality of towershaft gears 94. The plurality of towershaft gears 94 can be bevel gears, or the like. The plurality of towershaft gears 94 includes a first towershaft gear 94a coupled to the towershaft 90 and a second towershaft gear 94b coupled to the accessory gearbox input shaft 86. The first towershaft gear 94a intermeshes with the second towershaft gear 94b such that rotation of the towershaft 90 causes the accessory gearbox input shaft 86 to rotate. In this way, the towershaft 90 transmits mechanical energy from the HP shaft 34 to the accessory gearbox output shaft 88 through the accessory gearbox assembly 80, as detailed further below. The one or more rotating components 55 can include the towershaft 90 or the plurality of towershaft gears 94.

The turbine engine 10 includes a lubrication system 100, including a primary lubrication system 102, an auxiliary lubrication system 104, and a sump 106. The sump 106 (shown schematically in FIG. 2) is a reservoir that collects and stores lubricant therein. In some embodiments, the lubrication system 100 can include one or more tanks that store the lubricant therein. Preferably, the lubricant is oil. The lubricant can be any type of lubricant for lubricating the one or more rotating components 55 of the turbine engine 10 (e.g., the plurality of power gearbox gears 49 or the one or more power gearbox bearings 53).

The primary lubrication system 102 includes a primary pump 108 and a primary lubricant supply line 110. The primary pump 108 is in fluid communication with the sump 106 and the primary lubricant supply line 110. The primary lubricant supply line 110 is in fluid communication with the one or more rotating components 55 of the power gearbox assembly 46. The primary pump 108 pumps the lubricant from the sump 106 to the one or more rotating components 55 through the primary lubricant supply line 110 for supplying the lubricant to the one or more rotating components 55, as detailed further below. In some embodiments, the primary pump 108 is a mechanical pump. For example, the primary pump 108 can be coupled to, and powered by, the accessory gearbox assembly 80 such that the accessory gearbox assembly 80 drives the primary pump 108. In such an example, the primary pump 108 is coupled to a second output shaft 88b such that rotation of the second output shaft 88b powers the primary pump 108. In this way, the second output shaft 88b is a primary pump shaft of the primary pump 108. In some embodiments, the primary lubrication system 102 supplies the lubricant from the sump 106 to the one or more rotating components 55 without a pump, for example, by gravity or by centrifugal force due to rotation of the planet carrier 51 in the planetary arrangement of the power gearbox gear assembly 47.

The sump 106 is in fluid communication with the one or more rotating components 55 such that the lubricant drains from the one or more rotating components 55 to the sump 106, for example, through a scavenge line (not shown in FIG. 2 for clarity). In some embodiments, the lubrication system 100 includes a sump pump in fluid communication with the primary lubrication system 102 and the auxiliary lubrication system 104. The sump pump pumps the lubricant from the sump 106 to the primary lubrication system 102 or the auxiliary lubrication system 104.

The auxiliary lubrication system 104 includes an auxiliary pump 120, an auxiliary lubricant supply line 122, an auxiliary lubricant supply line valve 124 disposed in the auxiliary lubricant supply line 122, and an auxiliary lubricant return line 126. The auxiliary lubricant supply line 122 is in fluid communication with the sump 106 and the one or more rotating components 55. While the auxiliary lubricant supply line 122 is depicted as being in fluid communication with the power gearbox assembly 46 in FIG. 2, the auxiliary lubricant supply line 122 can be in fluid communication with any of the one or more rotating components 55 of the turbine engine 10. Further, while the auxiliary lubricant supply line 122 is depicted as a separate flow line as the primary lubricant supply line 110 in FIG. 2, the auxiliary lubricant supply line 122 can form a part of the primary lubricant supply line 110. The auxiliary pump 120 is in fluid communication with the sump 106 and the auxiliary lubricant supply line 122. The auxiliary pump 120 is a mechanical pump that is powered by the accessory gearbox assembly 80. The auxiliary lubricant supply line valve 124 is a check valve that opens or closes based on a pressure of the lubricant in the auxiliary lubricant supply line 122 from the sump 106. For example, the auxiliary lubricant supply line valve 124 opens when the pressure of the lubricant in the auxiliary lubricant supply line 122 from the sump 106 is greater than a lubricant pressure threshold. The auxiliary lubricant supply line valve 124 closes when the pressure of the lubricant in the auxiliary lubricant supply line 122 from the sump 106 is less than the lubricant pressure threshold. The auxiliary lubricant return line 126 is in fluid communication with the auxiliary lubricant supply line 122 and the sump 106 such that a portion of the lubricant is returned to the sump 106 through the auxiliary lubricant supply line 122, as detailed further below.

The lubrication system 100 includes a kinetic energy storage system 130 that stores kinetic energy and releases the kinetic energy to power the auxiliary lubrication system 104, as detailed further below. The kinetic energy storage system 130 includes a rotating lubricant accumulator 132 that accumulates lubricant during normal operation of the turbine engine 10 and supplies the lubricant to the one or more rotating components 55 during windmilling of the turbine engine 10, as detailed further below. The rotating lubricant accumulator 132 is a cylinder or has a similar shape, and includes a first chamber 134 and a second chamber 136 that are fluidly separated by a membrane 138. The first chamber 134 is filled with lubricant during normal operation of the turbine engine 10, as detailed further below. The second chamber 136 is filled with an inert gas, such as, for example, nitrogen, or the like. The inert gas in the second chamber 136 has a gas pressure that biases the membrane 138 towards the first chamber 134. The membrane 138 is a metal disk, or the like, and is axially movable within the rotating lubricant accumulator 132. In some embodiments, the rotating lubricant accumulator 132 includes one or more springs that are coupled to the membrane 138 and disposed in the second chamber 136 such that the one or more springs bias the membrane 138 towards the first chamber 134.

The auxiliary lubrication system 104 includes an auxiliary lubricant branch line 140 fluidly coupled with the auxiliary lubricant supply line 122 and the first chamber 134 of the rotating lubricant accumulator 132. In this way, a portion of the lubricant is supplied from the sump 106 to the first chamber 134 of the rotating lubricant accumulator 132 through the auxiliary lubricant branch line 140, as detailed further below.

The kinetic energy storage system 130 includes a motor 150 having a motor shaft 152, a first kinetic energy storage system valve 160, and a second kinetic energy storage system valve 162. The rotating lubricant accumulator 132 is drivingly coupled to the motor 150 via the motor shaft 152. In this way, the motor 150 drives the rotating lubricant accumulator 132 to rotate the rotating lubricant accumulator 132 to store kinetic energy, as detailed further below. The motor 150 is in fluid communication with the auxiliary lubricant return line 126 such that the lubricant flows from the auxiliary lubricant supply line 122, through the auxiliary lubricant return line 126, through the motor 150, and into the sump 106, for powering the motor 150, as detailed further below. The first kinetic energy storage system valve 160 is disposed in the auxiliary lubricant supply line 122 (e.g., upstream of the motor 150). The second kinetic energy storage system valve 162 is disposed in the auxiliary lubricant return line 126 (e.g., downstream of the motor 150). The first kinetic energy storage system valve 160 and the second kinetic energy storage system valve 162 are, for example, two-way solenoid valves that are controlled to be opened or closed by the controller 79 (FIG. 1). The first kinetic energy storage system valve 160 is biased to be closed during normal operation of the turbine engine 10, and opens during windmilling. The second kinetic energy storage system valve 162 is biased to be closed during windmilling, and opens during normal operation of the turbine engine 10, as detailed further below.

In operation, the LP shaft 36 rotates, as detailed above, and causes the first power gearbox gear 49a to rotate. The first power gearbox gear 49a, being intermeshed with the one or more second power gearbox gears 49b, causes the one or more second power gearbox gears 49b to rotate about their corresponding axis of rotation. The one or more second power gearbox gears 49b rotate with respect to the one or more power gearbox bearings 53 within the planet carrier 51. When the power gearbox gear assembly 47 is the star arrangement, the one or more second power gearbox gears 49b, being intermeshed with the third power gearbox gear 49c, cause the third power gearbox gear 49c to rotate about the longitudinal centerline axis 12. In such embodiments, the planet carrier 51 remains stationary such that the one or more second power gearbox gears 49b do not rotate about the longitudinal centerline axis 12. When the power gearbox gear assembly 47 is the planetary arrangement, the third power gearbox gear 49c is stationary in the planet carrier 51, and the one or more second power gearbox gears 49b, rotate about the longitudinal centerline axis 12. When the power gearbox gear assembly 47 is the differential gear assembly, both the planet carrier 51 (e.g., the one or more second power gearbox gears 49b) and the third power gearbox gear 49c rotate about the longitudinal centerline axis 12. In this way, the one or more rotating components 55 rotate.

At the same time, the HP shaft 34 rotates and causes the towershaft 90 to rotate, thereby causing the accessory gearbox input shaft 86 and the plurality of accessory gearbox gears 84 of the accessory gearbox gear assembly 83 to rotate. The rotation of the plurality of accessory gearbox gears 84 causes the accessory gearbox output shaft 88 to rotate. In particular, the rotation of the plurality of accessory gearbox gears 84 causes the accessory gearbox output shaft 88 to rotate, thereby powering the primary pump 108. In this way, the primary lubrication system 102 supplies the lubricant to the one or more rotating components 55 to lubricate the one or more rotating components 55. During normal operation of the turbine engine 10, the primary pump 108 pumps the lubricant from the sump 106 and to the one or more rotating components 55 through the primary lubricant supply line 110. The primary lubrication system 102 supplies the lubricant to the one or more rotating components 55. The lubricant drains from the one or more rotating components 55 and into the sump 106. During the normal operation of the turbine engine 10, the lubricant in the sump 106 is returned through the primary lubrication system 102 such that the primary lubrication system 102 continuously supplies the lubricant to the one or more rotating components 55. In this way, the lubricant can be re-used to lubricate the one or more rotating components 55.

The auxiliary lubrication system 104 is inactive when the primary lubrication system 102 is active, such as when the turbine engine 10 is operating under normal operation. When the auxiliary lubrication system 104 is inactive, the first kinetic energy storage system valve 160 is closed to prevent the lubricant from flowing to the one or more rotating components 55 from the auxiliary lubrication system 104. The rotation of the accessory gearbox output shaft 88 powers the auxiliary pump 120 such that the auxiliary pump 120 pumps the lubricant from the sump 106. The pressure of the lubricant from the auxiliary pump 120 is greater than the lubricant pressure threshold of the auxiliary lubricant supply line valve 124 such that the auxiliary lubricant supply line valve 124 opens and the lubricant flows through the auxiliary lubricant supply line 122 upstream of the first kinetic energy storage system valve 160.

The auxiliary lubricant branch line 140 directs the lubricant into the rotating lubricant accumulator 132. For example, the auxiliary lubricant branch line 140 directs the lubricant into the first chamber 134 to fill the first chamber 134 with the lubricant. As the lubricant fills the first chamber 134, the lubricant forces the membrane 138 to move axially towards the second chamber 136, thereby compressing the inert gas and increasing the gas pressure of the inert gas in the second chamber 136. In this way, the kinetic energy storage system 130 (e.g., the rotating lubricant accumulator 132) stores kinetic energy in the form of an increased gas pressure of the inert gas in the second chamber 136.

At the same time, the auxiliary lubricant return line 126 directs the lubricant towards the motor 150. The lubricant flows through the motor 150 to power the motor 150, thereby causing the motor shaft 152 to rotate. The rotation of the motor shaft 152 causes the rotating lubricant accumulator 132 to rotate. In this way, the rotating lubricant accumulator 132 stores additional kinetic energy in the form of angular momentum. In this way, the rotating lubricant accumulator 132 will tend to continue to rotate after the motor 150 stops powering the rotating lubricant accumulator 132.

During normal operation of the turbine engine 10, the second kinetic energy storage system valve 162 is open and the auxiliary lubricant return line 126 directs the lubricant from the motor 150 to the sump 106. The auxiliary pump 120 continues to pump the lubricant from the sump 106 such that the lubricant is recirculated through the kinetic energy storage system 130. In this way, the lubricant fills the rotating lubricant accumulator 132 (e.g., the first chamber 134) until the gas pressure of the inert gas in the rotating lubricant accumulator 132 increases to a gas pressure threshold. The lubricant is then prevented from flowing through the auxiliary lubricant branch line 140 due to the rotating lubricant accumulator 132 being unable to be filled further. The lubricant then continuously flows through the motor 150 to power the motor 150 such that the motor 150 rotates the rotating lubricant accumulator 132.

The controller 79 (FIG. 1) controls the first kinetic energy storage system valve 160 and the second kinetic energy storage system valve 162 to open or to close. In some embodiments, the controller 79 controls the first kinetic energy storage system valve 160 to close and the second kinetic energy storage system valve 162 to open by providing an electrical signal to the first kinetic energy storage system valve 160 and the second kinetic energy storage system valve 162, respectively. In some embodiments, the controller 79 controls the first kinetic energy storage system valve 160 and the second kinetic energy storage system valve 162 to open or to close based on a rotational speed of at least one of the HP shaft 34, the LP shaft 36, or the propulsor shaft 45. For example, the controller 79 controls the first kinetic energy storage system valve 160 to close and the second kinetic energy storage system valve 162 to open when the rotational speed of the at least one of the HP shaft 34, the LP shaft 36, or the propulsor shaft 45 is greater than a rotational speed threshold. In some embodiments, the controller 79 controls the first kinetic energy storage system valve 160 and the second kinetic energy storage system valve 162 to open or to close based on a pressure of the lubricant in the primary lubrication system 102. For example, the controller 79 controls the first kinetic energy storage system valve 160 to close and the second kinetic energy storage system valve 162 to open when the pressure of the lubricant in the primary lubrication system 102 is greater than a primary pressure threshold.

In some instances, the primary lubrication system 102 may be unable to provide the lubricant to the one or more rotating components 55. For example, the primary lubrication system 102 may be unable to pressurize the lubricant to supply the lubricant to the one or more rotating components 55 during windmilling, while the turbine engine 10 is shut down, or during a failure of the turbine engine 10 or failure of the primary lubrication system 102 (e.g., the primary pump 108) while in-flight. In such instances, the windmilling may cause the shafts (e.g., the propulsor shaft 45, the HP shaft 34, and the LP shaft 36) of the turbine engine 10 to rotate, thereby causing the one or more rotating components 55 to continue to rotate. As mentioned above, the one or more rotating components 55 (e.g., the plurality of power gearbox gears 49 or the one or more power gearbox bearings 53) can become damaged if there is not enough lubricant supplied to the one or more rotating components 55.

Accordingly, during such instances, the auxiliary lubrication system 104 activates to supply the lubricant to the one or more rotating components 55. The first kinetic energy storage system valve 160 opens to allow the lubricant to flow through the auxiliary lubricant supply line 122 to the one or more rotating components 55. At the same time, the second kinetic energy storage system valve 162 closes to prevent the lubricant from flowing through the auxiliary lubricant return line 126. In this way, the motor 150 stops rotating the rotating lubricant accumulator 132. In some embodiments, the first kinetic energy storage system valve 160 opens and the second kinetic energy storage system valve 162 closes when the first kinetic energy storage system valve 160 and the second kinetic energy storage system valve 162 do not receive the electrical signal from the controller 79 (FIG. 1). In some embodiments, the controller 79 controls the first kinetic energy storage system valve 160 to open and the second kinetic energy storage system valve 162 to close when the rotational speed of the at least one of the HP shaft 34, the LP shaft 36, or the propulsor shaft 45 is less than the rotational speed threshold. In some embodiments, the controller 79 controls the first kinetic energy storage system valve 160 to open and the second kinetic energy storage system valve 162 to close when the pressure of the lubricant in the primary lubrication system 102 is less than the primary pressure threshold.

When the turbine engine 10 is shut down, or the propulsor 38 is otherwise windmilling, the accessory gearbox output shaft 88 does not rotate fast enough to properly power the auxiliary pump 120. In this way, the pressure of the lubricant from the auxiliary pump 120 is less than the lubricant pressure threshold of the auxiliary lubricant supply line valve 124 such that the auxiliary lubricant supply line valve 124 closes.

When the turbine engine 10 is shut down, or the propulsor 38 is otherwise windmilling, the kinetic energy storage system 130 releases the stored kinetic energy. The lubricant pressure of the lubricant in the rotating lubricant accumulator 132 (e.g., the first chamber 134) is greater than the lubricant pressure of the lubricant from the auxiliary pump 120. In this way, the gas pressure of the inert gas in the rotating lubricant accumulator 132 (e.g., the second chamber 136) forces the membrane 138 towards the first chamber 134, such that the membrane 138 exerts a force on the lubricant in the first chamber 134 to push the lubricant out of the first chamber 134 and through the auxiliary lubricant branch line 140. In this way, the kinetic energy storage system 130 releases the stored kinetic energy that is in the form of the increased gas pressure of the inert gas. In embodiments that utilize a spring coupled to the membrane 138, the spring can expand to release the stored kinetic energy and force the membrane 138 towards the first chamber 134.

At the same time, when the motor 150 is no longer rotating the rotating lubricant accumulator 132, the rotating lubricant accumulator 132 releases the stored additional kinetic energy. For example, the angular momentum of the rotating lubricant accumulator 132 continues rotation of the rotating lubricant accumulator 132. In this way, the rotating lubricant accumulator 132 rotates at a high rotational speed (e.g., between 500 rpm and 5000 rpm RPM). Thus, the additional kinetic energy stored by the rotating lubricant accumulator 132 is transferred to the membrane 138 to help force the membrane 138 towards the first chamber 134, thereby forcing the lubricant out of the rotating lubricant accumulator 132.

The auxiliary lubricant branch line 140 directs the lubricant from the rotating lubricant accumulator 132 through the auxiliary lubricant supply line 122 and to the one or more rotating components 55. In this way, the auxiliary lubrication system 104 supplies the lubricant to the one or more rotating components 55 while the turbine engine 10 is shut down or the propulsor 38 is otherwise windmilling.

Accordingly, the auxiliary lubrication system 104 supplies the lubricant to the one or more rotating components 55 while the turbine engine 10 is shut down or is otherwise windmilling. The kinetic energy storage system 130 ensures that the auxiliary lubrication system 104 operates to supply the lubricant to the one or more rotating components 55 independently of the rotational direction of the propulsor 38 during windmilling (e.g., whether the propulsor is rotating clockwise or counterclockwise). The kinetic energy storage system 130 also reduces complexity of the auxiliary lubrication system 104, as compared to auxiliary lubrication systems without the benefit of the present disclosure, by powering the auxiliary pump 120 independently of the propulsor shaft rotation or rotation of other shafts of the turbine engine 10.

Further aspects of the present disclosure are provided by the subject matter of the following clauses.

A lubrication system for a turbine engine, the turbine engine including a propulsor and one or more rotating components, the lubrication system comprising a sump that stores lubricant therein, a primary lubrication system supplying the lubricant from the sump to the one or more rotating components during normal operation of the turbine engine, an auxiliary lubrication system comprising an auxiliary pump, and a kinetic energy storage system comprising a rotating lubricant accumulator, the auxiliary pump pumping the lubricant from the sump to the rotating lubricant accumulator to at least partially fill the rotating lubricant accumulator with the lubricant during the normal operation of the turbine engine to store kinetic energy, and the rotating lubricant accumulator releases the kinetic energy when the propulsor is windmilling to supply the lubricant from the rotating lubricant accumulator to the one or more rotating components.

The lubrication system of the preceding clause, wherein the auxiliary pump pumps the lubricant from the sump to the rotating lubricant accumulator to fill the rotating lubricant accumulator with the lubricant during the normal operation of the turbine engine.

The lubrication system of any preceding clause, the turbine engine comprising an accessory gearbox assembly having a plurality of accessory gearbox gears, and the auxiliary pump is drivingly coupled to the plurality of accessory gearbox gears such that rotation of the plurality of accessory gearbox gears powers the auxiliary pump.

The lubrication system of any preceding clause, the kinetic energy storage system comprising a first kinetic energy storage system valve that is closed during the normal operation of the turbine engine, and the first kinetic energy storage system valve prevents the lubricant from flowing through the auxiliary lubrication system to the one or more rotating components such that the auxiliary lubrication system is inactive during the normal operation of the turbine engine.

The lubrication system of any preceding clause, the first kinetic energy storage system valve opening when the propulsor is windmilling such that the lubricant is supplied from the rotating lubricant accumulator to the one or more rotating components.

The lubrication system of any preceding clause, the kinetic energy storage system comprising a second kinetic energy storage system valve that is open during the normal operation of the turbine engine such that a portion of the lubricant through the auxiliary lubrication system flows to the sump through the second kinetic energy storage system valve, and the second kinetic energy storage system valve is closed when the propulsor is windmilling such that the portion of the lubricant through the auxiliary lubrication system is prevented from flowing to the sump.

The lubrication system of any preceding clause, the rotating lubricant accumulator comprising a first chamber, a second chamber, and a membrane disposed between the first chamber and the second chamber, and the first chamber fills with the lubricant and the membrane moves axially towards the second chamber to store the kinetic energy during the normal operation of the turbine engine.

The lubrication system of any preceding clause, the membrane moving axially towards the first chamber to force the lubricant from the rotating lubricant accumulator and to the one or more rotating components when the propulsor is windmilling.

The lubrication system of any preceding clause, the second chamber being filled with an inert gas, and a gas pressure of the inert gas increases when the membrane moves axially towards the second chamber to store the kinetic energy.

The lubrication system of any preceding clause, the kinetic energy storage system comprising a motor that powers the rotating lubricant accumulator during normal operation of the turbine engine such that the rotating lubricant accumulator rotates and stores additional kinetic energy.

The lubrication system of any preceding clause, the rotating lubricant accumulator releasing the additional kinetic energy to supply the lubricant from the rotating lubricant accumulator when the propulsor is windmilling by continuing to rotate after the motor stops powering the rotating lubricant accumulator.

The lubrication system of any preceding clause, the turbine engine comprising a power gearbox assembly having a plurality of power gearbox gears.

The lubrication system of any preceding clause, the one or more rotating components being one or more power gearbox bearings of the power gearbox assembly.

The lubrication system of any preceding clause, the one or more power gearbox bearings being journal bearings.

The lubrication system of any preceding clause, the turbine engine further comprising a towershaft coupled to the at least one of the high-pressure shaft or the low-pressure shaft.

The lubrication system of any preceding clause, the accessory gearbox assembly further comprising an accessory gearbox input shaft and an accessory gearbox output shaft.

The lubrication system of any preceding clause, the accessory gearbox input shaft being drivingly coupled to the towershaft.

The lubrication system of any preceding clause, the accessory gearbox input shaft being drivingly coupled to the towershaft by a towershaft gear assembly.

The lubrication system of any preceding clause, the accessory gearbox assembly having an accessory gearbox housing, the plurality of accessory gearbox gears being disposed within the accessory gearbox housing.

The lubrication system of any preceding clause, the plurality of accessory gearbox gears including a first accessory gearbox gear and a second accessory gearbox gear.

The lubrication system of any preceding clause, the accessory gearbox input shaft being coupled to the first accessory gearbox gear.

The lubrication system of any preceding clause, the accessory gearbox output shaft being coupled to the second accessory gearbox gear.

The lubrication system of any preceding clause, the auxiliary lubrication system comprising an auxiliary lubricant supply line in fluid communication with the sump and the one or more rotating components.

The lubrication system of any preceding clause, the primary lubrication system comprising a primary lubricant supply line in fluid communication with the sump and the one or more rotating components.

The lubrication system of any preceding clause, the auxiliary lubrication system comprising an auxiliary lubricant supply line valve that opens to allow the lubricant to flow from the sump to the rotating lubricant accumulator during the normal operation of the turbine engine.

The lubrication system of any preceding clause, the auxiliary lubricant supply line valve closing to prevent the lubricant from flowing from the sump to the rotating lubricant accumulator when the propulsor is windmilling.

The lubrication system of any preceding clause, the auxiliary lubrication system further comprising an auxiliary lubricant branch line in fluid communication with the auxiliary lubricant supply line and the rotating lubricant accumulator.

The lubrication system of any preceding clause, the inert gas being nitrogen.

A turbine engine comprising a propulsor and a turboengine having a shaft, the propulsor being drivingly coupled to the shaft. The turbine engine comprises the lubrication system of any preceding clause.

A method of operating the lubrication system of any preceding clause, the method comprising supplying the lubricant through the primary lubrication system to the one or more rotating components during normal operation of the turbine engine, pumping, with the auxiliary pump, the lubricant from the sump to the rotating lubricant accumulator during the normal operation of the turbine engine, storing kinetic energy in the rotating lubricant accumulator by filling the rotating lubricant accumulator with the lubricant during the normal operation of the turbine engine, and supplying the lubricant from the rotating lubricant accumulator to the one or more rotating components when the propulsor is windmilling by releasing the kinetic energy.

The method of any preceding clause, the turbine engine comprising an accessory gearbox assembly having a plurality of accessory gearbox gears, and the method further comprises driving the auxiliary pump with the plurality of accessory gearbox gears such that rotation of the plurality of accessory gearbox gears powers the auxiliary pump.

The method of any preceding clause, the kinetic energy storage system comprising a first kinetic energy storage system valve, and the method further comprises preventing the lubricant from flowing through the auxiliary lubrication system to the one or more rotating components by closing the first kinetic energy storage system valve during the normal operation of the turbine engine.

The method of any preceding clause, further comprising opening the first kinetic energy storage system valve when the propulsor is windmilling such that the lubricant is supplied from the rotating lubricant accumulator to the one or more rotating components.

The method of any preceding clause, the kinetic energy storage system comprising a second kinetic energy storage system valve, and the method further comprises directing a portion of the lubricant through the auxiliary lubrication system to the sump by opening the second kinetic energy storage system valve during the normal operation of the turbine engine, and preventing the portion of the lubricant from flowing through the auxiliary lubrication system and to the sump by closing the second kinetic energy storage system valve when the propulsor is windmilling.

The method of any preceding clause, the rotating lubricant accumulator comprising a first chamber, a second chamber, and a membrane disposed between the first chamber and the second chamber, and the method further comprises filling the first chamber with the lubricant such that the membrane moves axially towards the second chamber to store the kinetic energy during the normal operation of the turbine engine.

The method of any preceding clause, further comprising moving the membrane axially towards the first chamber to force the lubricant from the rotating lubricant accumulator and to the one or more rotating components when the propulsor is windmilling.

The method of any preceding clause, the second chamber being filled with an inert gas, and the method further comprises increasing a gas pressure of the inert gas when the membrane moves axially towards the second chamber to store the kinetic energy.

The method of any preceding clause, the kinetic energy storage system comprising a motor, and the method further comprises powering the rotating lubricant accumulator with the motor during normal operation of the turbine engine such that the rotating lubricant accumulator rotates and stores additional kinetic energy.

The method of any preceding clause, further comprising releasing the additional kinetic energy from the rotating lubricant accumulator to supply the lubricant from the rotating lubricant accumulator when the propulsor is windmilling by continuing to rotate after the motor stops powering the rotating lubricant accumulator.

The method of any preceding clause, the lubrication system being the lubrication system of any preceding clause.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A lubrication system for a turbine engine, the turbine engine including a propulsor and one or more rotating components, the lubrication system comprising:
   a sump that stores lubricant therein;
   a primary lubrication system supplying the lubricant from the sump to the one or more rotating components during normal operation of the turbine engine;
   an auxiliary lubrication system comprising an auxiliary pump; and
   a kinetic energy storage system comprising a rotating lubricant accumulator, wherein the auxiliary pump pumps the lubricant from the sump to the rotating lubricant accumulator to at least partially fill the rotating lubricant accumulator with the lubricant during the normal operation of the turbine engine to store kinetic energy, and the rotating lubricant accumulator releases the kinetic energy when the propulsor is windmilling to supply the lubricant from the rotating lubricant accumulator to the one or more rotating components.

2. The lubrication system of claim 1, wherein the turbine engine comprises an accessory gearbox assembly having a plurality of accessory gearbox gears, and the auxiliary pump is drivingly coupled to the plurality of accessory gearbox gears such that rotation of the plurality of accessory gearbox gears powers the auxiliary pump.

3. The lubrication system of claim 1, wherein the kinetic energy storage system comprises a first kinetic energy storage system valve that is closed during the normal operation of the turbine engine, and the first kinetic energy storage system valve prevents the lubricant from flowing through the auxiliary lubrication system to the one or more rotating components such that the auxiliary lubrication system is inactive during the normal operation of the turbine engine.

4. The lubrication system of claim 3, wherein the first kinetic energy storage system valve opens when the propulsor is windmilling such that the lubricant is supplied from the rotating lubricant accumulator to the one or more rotating components.

5. The lubrication system of claim 3, wherein the kinetic energy storage system comprises a second kinetic energy storage system valve that is open during the normal operation of the turbine engine such that a portion of the lubricant through the auxiliary lubrication system flows to the sump through the second kinetic energy storage system valve, and the second kinetic energy storage system valve is closed when the propulsor is windmilling such that the portion of the lubricant through the auxiliary lubrication system is prevented from flowing to the sump.

6. The lubrication system of claim 1, wherein the rotating lubricant accumulator comprises a first chamber, a second chamber, and a membrane disposed between the first chamber and the second chamber, and the first chamber fills with the lubricant and the membrane moves axially towards the second chamber to store the kinetic energy during the normal operation of the turbine engine.

7. The lubrication system of claim 6, wherein the membrane moves axially towards the first chamber to force the lubricant from the rotating lubricant accumulator and to the one or more rotating components when the propulsor is windmilling.

8. The lubrication system of claim 7, wherein the second chamber is filled with an inert gas, and a gas pressure of the inert gas increases when the membrane moves axially towards the second chamber to store the kinetic energy.

9. The lubrication system of claim 6, wherein the kinetic energy storage system comprises a motor that powers the rotating lubricant accumulator during normal operation of the turbine engine such that the rotating lubricant accumulator rotates and stores additional kinetic energy.

10. The lubrication system of claim 9, wherein the rotating lubricant accumulator releases the additional kinetic energy to supply the lubricant to the one or more rotating components from the rotating lubricant accumulator when the propulsor is windmilling by continuing to rotate after the motor stops powering the rotating lubricant accumulator.

11. A method of operating the lubrication system for a turbine engine, the method comprising:
   supplying lubricant through a primary lubrication system from a sump to one or more rotating components of the turbine engine during normal operation of the turbine engine;
   pumping, with an auxiliary pump of an auxiliary lubrication system, the lubricant from the sump to a rotating lubricant accumulator during the normal operation of the turbine engine;
   storing kinetic energy in the rotating lubricant accumulator by at least partially filling the rotating lubricant accumulator with the lubricant during the normal operation of the turbine engine; and
   supplying the lubricant from the rotating lubricant accumulator to the one or more rotating components when a propulsor of the turbine engine is windmilling by releasing the kinetic energy.

12. The method of claim 11, wherein the turbine engine comprises an accessory gearbox assembly having a plurality of accessory gearbox gears, and the method further comprises driving the auxiliary pump with the plurality of accessory gearbox gears such that rotation of the plurality of accessory gearbox gears powers the auxiliary pump.

13. The method of claim 11, wherein the turbine engine comprises a kinetic energy storage system including the rotating lubricant accumulator and a first kinetic energy storage system valve, and the method further comprises preventing the lubricant from flowing through the auxiliary lubrication system to the one or more rotating components by closing the first kinetic energy storage system valve during the normal operation of the turbine engine.

14. The method of claim 13, further comprising opening the first kinetic energy storage system valve when the propulsor is windmilling such that the lubricant is supplied from the rotating lubricant accumulator to the one or more rotating components.

15. The method of claim 13, wherein the kinetic energy storage system comprises a second kinetic energy storage system valve, and the method further comprises directing a portion of the lubricant through the auxiliary lubrication system to the sump by opening the second kinetic energy storage system valve during the normal operation of the turbine engine, and preventing the portion of the lubricant from flowing through the auxiliary lubrication system and to the sump by closing the second kinetic energy storage system valve when the propulsor is windmilling.

16. The method of claim 13, wherein the kinetic energy storage system comprises a motor, and the method further comprises powering the rotating lubricant accumulator with the motor during normal operation of the turbine engine such that the rotating lubricant accumulator rotates and stores additional kinetic energy.

17. The method of claim 16, further comprising releasing the additional kinetic energy from the rotating lubricant accumulator to supply the lubricant from the rotating lubricant accumulator when the propulsor is windmilling by continuing to rotate after the motor stops powering the rotating lubricant accumulator.

18. The method of claim 11, wherein the rotating lubricant accumulator comprises a first chamber, a second chamber, and a membrane disposed between the first chamber and the second chamber, and the method further comprises filling the first chamber with the lubricant such that the membrane moves axially towards the second chamber to store the kinetic energy during the normal operation of the turbine engine.

19. The method of claim 18, further comprising moving the membrane axially towards the first chamber to force the lubricant from the rotating lubricant accumulator and to the one or more rotating components when the propulsor is windmilling.

20. The method of claim 19, wherein the second chamber is filled with an inert gas, and the method further comprises increasing a gas pressure of the inert gas when the membrane moves axially towards the second chamber to store the kinetic energy.

* * * * *